Jan. 6, 1942.  E. L. C. WHITE ET AL  2,268,790
VOLTAGE STABILIZING DEVICE FOR ELECTRIC SUPPLY SYSTEMS
Filed May 27, 1939

INVENTORS
ERIC L. C. WHITE AND
HUGH L. MANSFORD
BY
ATTORNEY.

Patented Jan. 6, 1942

2,268,790

UNITED STATES PATENT OFFICE 2,268,790

VOLTAGE STABILIZING DEVICE FOR ELECTRIC SUPPLY SYSTEMS

Eric Lawrence Casling White, Hillingdon, and Hugh Lyon Mansford, Ickenham, England, assignors to Electric & Musical Industries Limited, Hayes, Middlesex, England, a company of Great Britain Application May 27, 1939, Serial No. 276,252
In Great Britain June 1, 1938

3 Claims. (Cl. 171—312)

The present invention relates to voltage control devices for electric supply systems, and more especially the invention relates to voltage control devices of the kind known as voltage stabilizers, wherein a voltage applied to a load is maintained substantially independent of voltage derived from a source of supply and of variations in load current.

Effective voltage stabilizing arrangements are known wherein a thermionic control valve connected in shunt across the load has the whole or a part of the output voltage applied between its control grid and the negative side of the load, the cathode of the valve being maintained at a fixed potential with reference to the negative side of the load and the anode of the valve being connected with the positive input line over a suitable loading resistance and to the control grid of a regulating valve arranged in series with the load. Between the cathode of the control valve connected in shunt and the negative side of the load may be connected a source of steady voltage which may be a battery or a neon stabiliser which functions to develop a control voltage to maintain the output voltage applied to the load constant.

While stabilizing arrangements of the above described kind are highly effective, their use is limited in that in cases where a number of stabilizers are used together, the arrangement may become cumbersome or expensive to maintain due to the fact that the current supplied to the source of control voltage is relatively heavy and it is therefore difficult to operate the plurality of stabilizing devices using a common source of control voltage. Moreover, the stabilizer cannot be operated to provide a relatively low stabilized output.

The object of the present invention is to overcome these disadvantages.

In accordance with the present invention a voltage stabilizing arrangement is provided in which a regulating valve arranged in series with the load is connected in the output of a control valve between the control electrode and the cathode of which a potential is applied which is proportional to the voltage developed across the load said potential being derived from a tapping on a high resistance connected between the positive terminal of the load and a point at a substantially negative potential with respect to the negative terminal of the load by means of a source of control potential connected between said point and said negative terminal.

In order to enable the stabilizer output voltage to be adjusted over a wide range, including down to zero, part of the source of control potential can be connected between the negative terminal of the load and the cathode of said control valve.

The nature of the invention and the method of carrying the invention into effect will be fully understood from the following description, reference being made by way of example to the accompanying drawing in which.

In the various figures of the drawing like parts are indicated by the same reference numerals.

Figure 1:
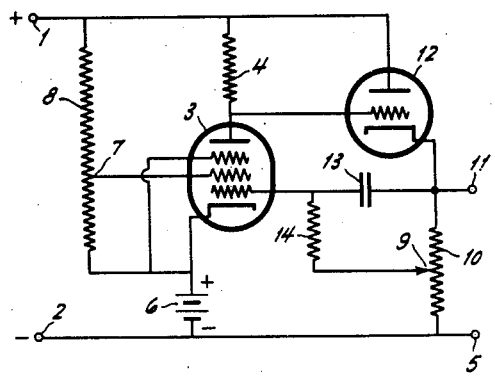
Figure 1 shows a known voltage stabilizing circuit.
Figure 2:
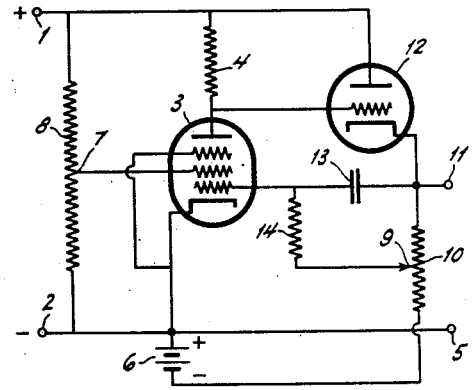
Figures 2, 3 and 4 show voltage stabilizing circuit arrangements according to the present invention.

In the arrangement shown in Figure 1, 1 and 2 are input terminals adapted to be connected to a source of direct current voltage, the value of which is liable to fluctuation from time to time. Terminal 1 is the positive terminal and terminal 2 is the negative terminal. In shunt between the terminals 1 and 2 is connected a thermionic valve 3 having a high amplification factor, and shown as being of the screen grid pentode type. This valve is the aforesaid control valve. The anode of the control valve 3 is connected to the terminal 1 through a loading resistance 4 which may be of the order of half-a-megohm, the cathode of the valve being connected to the terminal 2 and to negative output terminal 5 through a source of control potential 6 which may be a battery as shown or a neon stabilizer or other source of constant voltage. Screen grid potential of the valve 3 is derived from a tap 7 on the potentiometer resistance 8 connected between the terminal 1 and the cathode of the valve 3. The control grid of the valve 3 is connected to an adjustable tap 9 on a high resistance 10 connected in shunt across the load which may be connected between the aforesaid negative terminal 5 and the positive output terminal 11.

Arranged in series with the load on the positive side thereof is a further thermionic valve 12 of which the control grid is connected to the anode of valve 3. Valve 12 is the regulating valve.

This arrangement operates in the following way. If the voltage applied between terminals 1 and 2 increases both the shunt branches including the resistance 4 control valve 3 and source of control potential 6 and the regulating valve 12 and the load connected between terminals 11 and 5 respectively will tend to draw more current, thus the potential drop across resistance 4 in the former of the said two shunt branches will increase and the lower end of the resistance 4, that is to say, the anode of the valve 3, will tend to become more negative and consequently the control grid of the valve 12 will become more negative so that the effective impedance of the valve 12 will be increased thereby tending to decrease the current in the second mentioned shunt branch. However, if, notwithstanding the increase of the impedance of the valve 12, the current in the second mentioned shunt branch does show some increase the voltage between the tap 9 and the negative line between the terminal 2 and 5 will increase and consequently the grid of the valve 3 will become more positive with respect to its cathode thereby reducing the effective impedance of the valve 3 and thereby increasing the extent to which the lower end of the resistance 4 goes negative thereby still further increasing the effective impedance of the valve 12. As the valve 3 has a large amplification factor the effect of any change in output voltage will be very pronounced. The magnitude of the bias between the control grid of the valve 3 and the cathode will be determined by the value of the source of control potential 6 which will thereby exert control of the voltage regulation derived from the tap 9 in the output of the stabiliser.

Moreover, the position of the tap 9 will itself, determine to a certain extent the bias applied to the grid of valve 3. If the tap 9 is moved down resistance 10, the bias on the grid of valve 3 will become less positive or more negative with respect to the cathode so that the impedance of the valve 3 will increase. This will cause the grid of valve 12 to become more positive so that the impedance of the valve will be decreased. Thus the output voltage of the device will be increased.

It may also be noted that if the tap 9 is moved down resistance 10, the change of control voltage on the grid of valve 3 for a given change in output voltage may be reduced. Thus it may be advisable to connect a condenser such as 13 between the grid of valve 3 and the upper end of resistance 10 and a suitable resistance 14 in the lead to the grid of valve 3 from tap 9, as shown, so that the whole of any appreciable ripple potential developed across resistance 10 is applied to the grid of valve 3 notwithstanding that the tap 9 has been adjusted to give a high D. C. output voltage.

While the arrangement of Figure 1 is found to be highly effective in operation difficulty is experienced in a system comprising a number of similar arrangements owing to the fact that the source of control potential 6 is required to consume a relatively large current and it is therefore difficult to arrange one source of control potential to serve for a number of stabilisers. As shown in Figure 2, it is proposed to arrange the source of control potential 6 in series with the potentiometer resistance 10 which may be a high resistance of the order of a megohm, and the potential across the load. With this arrangement only a small current is drawn from the source of control potential 6 and a common battery may be used as a source of control potential for a large number of stabilizers and in normal conditions of use the battery may have a life of some months.

The arrangements of Figures 1 and 2 are both satisfactory in respect of the voltage control obtainable if the range of stabilized voltages required is not too great. However, if the range of output voltage is of the order of say two-thirds the input voltage difficulty is experienced in providing sufficient useful range of adjustment of the tap 9.

Figure 3:
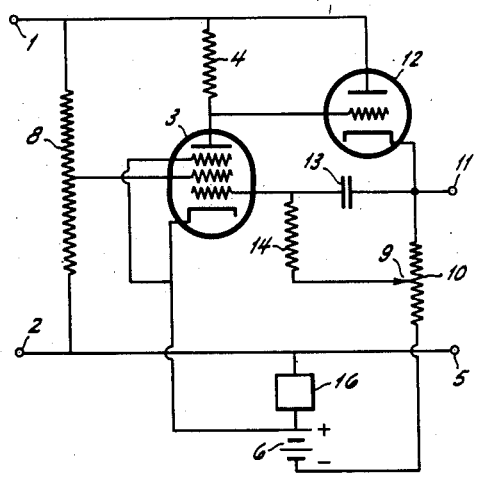

Thus in cases where the output voltage is required to be adjustable over a large range the arrangement of Figure 3 is preferred. This arrangement is similar to the arrangement of Figure 2 except that the lead to the cathode of the control valve 3 and the battery 6 is supplemented by a further source of potential 16 which is connected between the negative terminal 5 of the load and the cathode of valve 3 and which maintains a negative potential on the cathode of valve 3 with respect to the terminal 5. The source 16 is preferably constituted by a suitable voltage stabilizer. The screen grid of valve 3 may be connected directly to the line 2—5 and the potentiometer 7—8 omitted. If the potential of source 16 is at least equal to the sum of the minumum anode potential necessary for efficient working of control valve 3 and the bias required on the control electrode of regulating valve 12 to reduce current in the regulating valve to zero, it will be possible to adjust the output voltage substantially down to zero.

Figure 4:
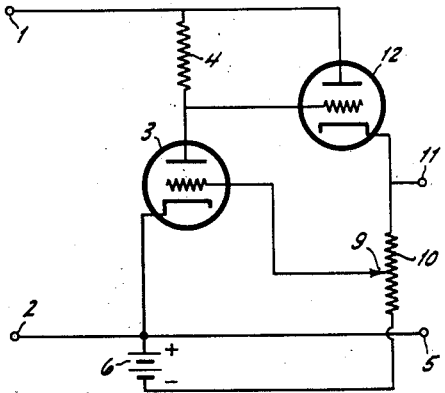

The arrangement of Figure 4 is a further voltage stabilizing arrangement generally similar to the arrangement of Figure 2 in which the valve 3 is a triode amplifier valve. As the control valve 3 in Figure 4 has no screen, the potentiometer resistance 8 is no longer necessary and is omitted, and also the A. C. coupling between the cathode of valve 12 to the grid of valve 3 has been omitted in order to give a regulation resistance and smoothing factor which is independent of frequency from zero up to a high value depending on the effects of stray capacities from the anode and grid of valve 3 to ground. In the case of the arrangement of Figure 4, the triode valve 3, with suitable design, can be arranged to have at least as great a gain as a pentode valve in this circuit.

If desired, in the above described arrangements, instead of connecting the output electrode or anode of the control valve 3 to the control or input electrode of the regulating valve 12, a valve having an impedance in its cathode lead can be inserted between the two valves mentioned, the anode of valve 3 being connected to the control electrode of the interposed valve and the cathode of the interposed valve being connected to the control electrode of the regulating valve 12. This arrangement facilitates the supply of grid current to the valve 12 should the grid or control electrode of that valve become positive with respect to the cathode at any time during the operation of the stabilizer.

It will further be understood, of course, that, while in each of the arrangements shown only one regulating valve is used, if the load current is too high to be dealt with by one regulating valve, two or more regulating valves can be arranged in parallel.

The use of an additional or "buffer" valve reduces the power required to operate the regulating arrangement.

We claim:

1. In a voltage regulating system, a positive input terminal, a positive output terminal and a common negative terminal, a regulating tube having an anode, a cathode and a control grid, an output impedance device and a source of constant voltage direct current, means for connecting said output impedance between said positive output terminal and the negative terminal of said source, said common terminal being connected to the positive terminal of said source, means connecting the positive input terminal to said anode and the positive output terminal to said cathode, a control tube having an anode, a cathode and a control grid, an impedance device connected between said last named anode and said positive input terminal, means for connecting the control grid of said regulating tube to a point of said last named impedance device, means for connecting the control grid of the control tube to a point of said output impedance device, and means for connecting the cathode of the control tube to a point of said source which is positive with respect to the negative terminal thereof.

2. The arrangement described in claim 1 characterized by that the control grid of the control tube is connected to said output impedance device through a series impedance element and to the positive output terminal through a condenser.

3. The arrangement described in claim 1 wherein the cathode of the control tube is connected directly to said common negative terminal.

ERIC LAWRENCE CASLING WHITE.
HUGH LYON MANSFORD.